(12) United States Patent
Smalley et al.

(10) Patent No.: US 11,428,561 B2
(45) Date of Patent: *Aug. 30, 2022

(54) DOSING TIMER AND DISPENSERS USING THE SAME

(71) Applicant: Silgan Dispensing Systems Corporation, Richmond, VA (US)

(72) Inventors: Leah Smalley, Grandview, MO (US); Brian Van Houten, Kansas City, MO (US); Kevin Rodgers, Cincinnati, OH (US)

(73) Assignee: Silgan Dispensing Systems Corporation, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,973

(22) Filed: Jun. 28, 2021

(65) Prior Publication Data

US 2021/0377375 A1 Dec. 2, 2021

Related U.S. Application Data

(63) Continuation of application No. 16/886,853, filed on May 29, 2020, now Pat. No. 11,054,294.

(51) Int. Cl.
| | |
|---|---|
| *G01F 11/26* | (2006.01) |
| *H04M 1/72484* | (2021.01) |
| *H04M 1/72454* | (2021.01) |
| *H04M 1/02* | (2006.01) |
| *H04N 5/225* | (2006.01) |
| *H04N 5/232* | (2006.01) |

(52) U.S. Cl.
CPC ......... *G01F 11/265* (2013.01); *H04M 1/0264* (2013.01); *H04M 1/72454* (2021.01); *H04M 1/72484* (2021.01); *H04N 5/2257* (2013.01); *H04N 5/23219* (2013.01); *H04M 2250/20* (2013.01); *H04M 2250/52* (2013.01)

(58) Field of Classification Search
CPC ........................................................ G01F 11/265
USPC ........................................................... 222/71
See application file for complete search history.

(56) References Cited

U.S. PATENT DOCUMENTS

| | | |
|---|---|---|
| 68,532 A | 9/1867 | Roooney |
| 745,744 A | 12/1903 | Uhalt |
| 1,621,252 A | 3/1927 | Hillyard |
| 2,099,629 A | 11/1937 | Schaetzel |
| 2,714,977 A | 8/1955 | Davis |
| 3,049,922 A | 8/1962 | Schwaneke |
| 3,103,099 A | 9/1963 | Hanks |
| 3,598,284 A | 8/1971 | Wessely |
| 3,647,115 A | 3/1972 | McCann et al. |
| 3,822,544 A | 7/1974 | Groves |
| 3,920,149 A | 11/1975 | Fortino et al. |
| 3,968,688 A | 7/1976 | Eaton et al. |
| 4,054,026 A | 10/1977 | Goodrich |
| 4,115,997 A | 9/1978 | Rogovin |
| 4,117,666 A | 10/1978 | Aguilar |
| 4,353,489 A | 10/1982 | Arnold et al. |
| 4,550,862 A | 11/1985 | Barker et al. |
| 4,666,065 A | 5/1987 | Ohren |

(Continued)

*Primary Examiner* — Paul R Durand
*Assistant Examiner* — Michael J. Melaragno
(74) *Attorney, Agent, or Firm* — Barlow, Josephs & Holmes, Ltd.; Stephen J. Holmes

(57) ABSTRACT

A timing device is integrated into a pour cap to visually indicate when a dose has been dispensed from the container. The timing device may be secured to either the pour cap or the container and timing is configurable based on a product being dispensed.

9 Claims, 12 Drawing Sheets

(56) References Cited

U.S. PATENT DOCUMENTS

| | | |
|---|---|---|
| 4,741,459 A | 5/1988 | Silvenis et al. |
| 4,836,415 A | 6/1989 | Grussmark |
| 5,031,804 A | 7/1991 | Conrad |
| 5,058,772 A | 10/1991 | Moore et al. |
| 5,392,947 A | 2/1995 | Gentile |
| 5,457,665 A | 10/1995 | Reid |
| 5,462,202 A | 10/1995 | Haffner et al. |
| 5,505,349 A | 4/1996 | Peckels |
| 5,507,411 A | 4/1996 | Peckels |
| 5,566,862 A | 10/1996 | Haffner et al. |
| 5,855,299 A | 1/1999 | Arnold et al. |
| 5,941,422 A | 8/1999 | Struble |
| 6,036,055 A | 3/2000 | Mogadam et al. |
| 6,301,961 B1 | 10/2001 | Rolfes et al. |
| 6,409,046 B1 | 6/2002 | Peckels |
| 6,505,752 B1 | 1/2003 | Rolfes et al. |
| 6,926,179 B2 | 8/2005 | Wagner, III et al. |
| 7,163,125 B2 | 1/2007 | Murakami et al. |
| 7,306,121 B2 | 12/2007 | Ophardt et al. |
| 7,845,524 B2 | 12/2010 | Evans et al. |
| 8,511,492 B2 | 8/2013 | Webster et al. |
| 9,428,374 B2 | 8/2016 | Houck et al. |
| 9,717,373 B2 | 8/2017 | Andrews et al. |
| 9,718,665 B2 | 8/2017 | Wittrup et al. |
| 10,327,599 B2 | 5/2019 | Smith et al. |
| 10,336,514 B1 | 7/2019 | Briggs et al. |
| 10,351,319 B1 | 7/2019 | Mizer et al. |
| 2005/0103803 A1 | 5/2005 | Hung et al. |
| 2006/0091152 A1 | 5/2006 | Evans et al. |
| 2006/0091153 A1 | 5/2006 | Evans et al. |
| 2006/0131330 A1 | 6/2006 | Stebick et al. |
| 2007/0029352 A1 | 2/2007 | Norris et al. |
| 2007/0194047 A1 | 8/2007 | Tauber et al. |
| 2009/0045224 A1 | 2/2009 | Faaborg et al. |
| 2010/0116776 A1 | 5/2010 | Szekely |
| 2010/0213211 A1 | 8/2010 | Whaling et al. |
| 2011/0297698 A1 | 12/2011 | Chiang et al. |
| 2012/0043295 A1 | 2/2012 | Webster et al. |
| 2013/0008919 A1 | 1/2013 | Honan et al. |
| 2013/0334246 A1 | 12/2013 | Houck et al. |
| 2014/0252034 A1 | 9/2014 | Brannon et al. |
| 2014/0346198 A1 | 11/2014 | Bond |
| 2015/0251822 A1 | 9/2015 | Slevin et al. |
| 2015/0298875 A1 | 10/2015 | Dagnelie et al. |
| 2017/0073115 A1 | 3/2017 | Crawford |
| 2018/0310778 A1 | 11/2018 | Smith et al. |
| 2019/0071299 A1 | 3/2019 | Briggs et al. |
| 2020/0025599 A1 | 1/2020 | Koster et al. |

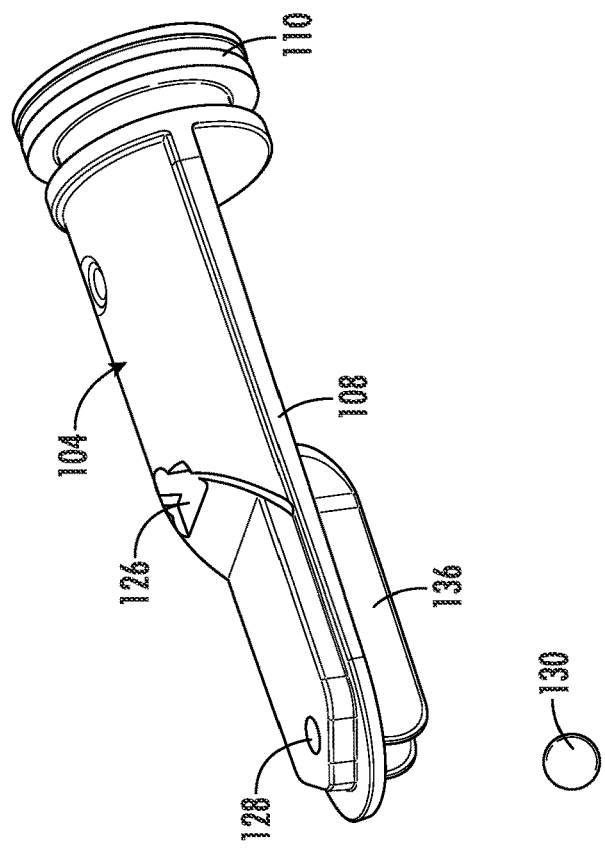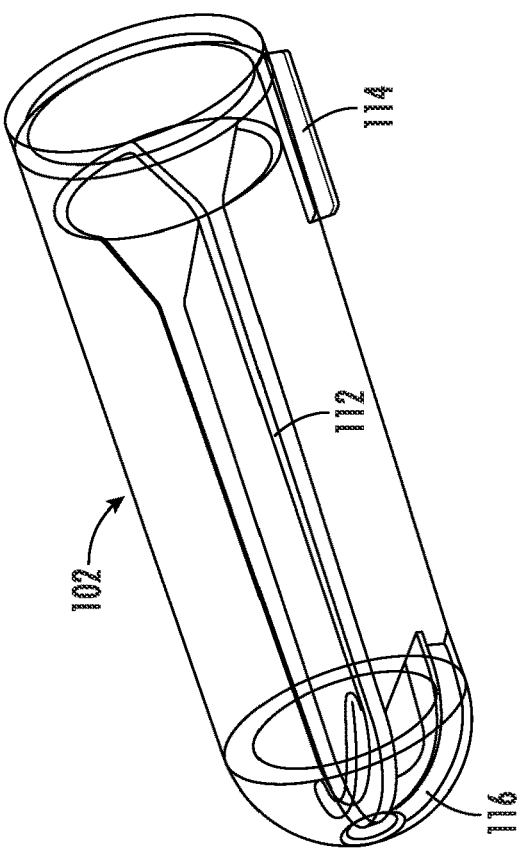
FIG. 5

DOSING TIMER AND DISPENSERS USING THE SAME

CROSS-REFERENCE TO RELATED APPLICATIONS

This application is a continuation of U.S. patent application Ser. No. 16/886,853 entitled DOSING TIMER AND DISPENSERS USING THE SAME, filed May 29, 2020, the entire contents of which is incorporated herein by reference.

BACKGROUND OF THE INVENTION

Field of the Invention: The present invention relates to dispensing systems and more particularly to a dosing timer for a dispenser device allowing a user to estimate the dispense rate or dosing volume of the dispenser device.

State of the Art: Dispensing devices are used to dispense a various number of products. Typically, a dispensing device—such as a pump, closure, trigger sprayer, or other device—is attached to a container or bottle containing a product to be dispensed. The dispensing device facilitates the dispensing of the product from the container or bottle.

In many instances, a user desires to measure the amount of product being dispensed from a container through the dispensing device. For example, in many laundry care applications, a dispensing device may include a cap that acts as a cup, having graduated markings in the cap so that a user may measure out a desired amount of product into the cap before pouring the product into an intended location. While such systems allow estimated measurements, many users complain about the additional mess associated with using the cap in such a manner and prefer a one-handed operation allowing them to pour or dispense a product directly into the desired location.

BRIEF SUMMARY OF THE INVENTION

According to certain embodiments of the invention, an integrated timing device or dosing timer, may be integrated with a pour cap or may be integrated with the associated bottle or container. A timing device according to embodiments of the invention may include a transparent or translucent outer cylinder which may be filled with a fluid or other product that may flow within the timing device to visually represent or correspond to a given amount of product being dispensed from the dispensing device. The timing device may include flow channels and/or flow restrictors which may be modified for a particular use such that the visible flow of the fluid or flowable material in the timing device may be used to measure the output of the dispensing device. The timing device may in some embodiments be positioned near the dispensing spout so that a user may visually monitor the timing device during operation. Fluid flowing into, or out of, the timing device may indicate when a dose has been dispensed from the dispensing device.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

FIG. 5 is an exploded perspective view thereof;

DETAILED DESCRIPTION OF THE INVENTION

An exemplary timing device 100 according to various embodiments of the invention is illustrated in FIGS. 1-14. An exemplary dispensing system utilizing the timer 100 may include a container 900 and an associated pour cap 1000. The pour cap 1000 may include mounting structures for receiving and holding the timing device 100 wherein the timing device is at least partially visible during use of the dispensing system.

Turning briefly to FIGS. 13-16, according to various embodiments of the invention, a pour cap 1000 may include a cap base 1002 which may be connected to or mated with a container 900. For instance, the cap base may include an inner skirt including inwardly extending threads, bayonet features, snap features, or other features allowing the pour cap to be connected to an opening or neck 902 of a container 900 having similar features. The exemplary pour cap 1000 and container neck 902 include mating snap beads, but this should not be considered limiting to the disclosure as noted above.

The cap base 1002 includes a main deck 1004 and a dispensing spout 1006 extending upwardly therefrom. A venting tube 1008 may be located within the main deck 1004 adjacent the rear portion of the dispensing spout opening 1006 and may extend into the interior of the cap base 1002. In other embodiments, the venting tube 1008 may be located at other locations depending on the configuration of the cap base 1002 and the size and orientation of the dispensing spout 1006. A venting orifice 1010 is located at the bottom terminal end of the venting tube 1008. The venting orifice 1010 may be provided by integrally molding the orifice or may be provided by a separate cap fitted over the terminal end of the venting tube 1008. The size of the venting orifice 1010 may be adjusted to determine the venting performance of the pour cap 1000 based on liquids with different viscosities.

A closure or lid (not shown) may also be connected to the cap base 1002 by a living hinge, snap retention system or other such retention system for enclosing the dispensing spout and other features of the cap during storage, transportation and handling.

Figure 1:
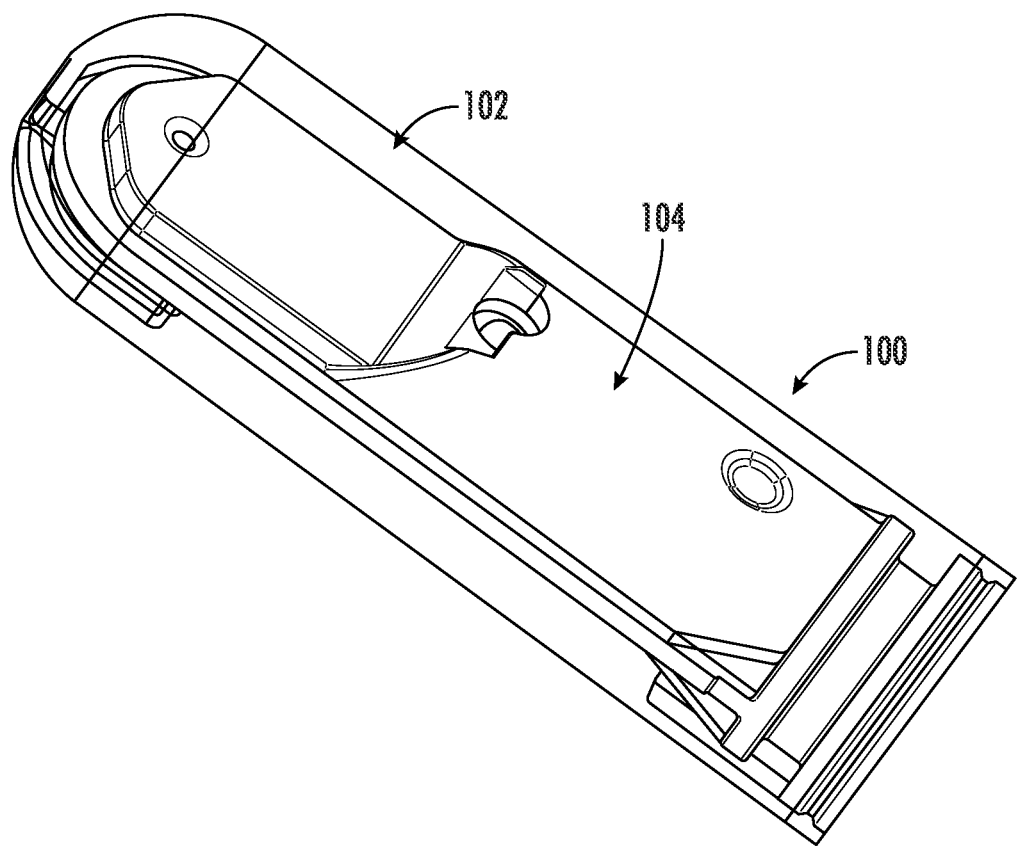
FIG. 1 is a top perspective view of an exemplary timing device according to various embodiments of the invention.
Figure 2:
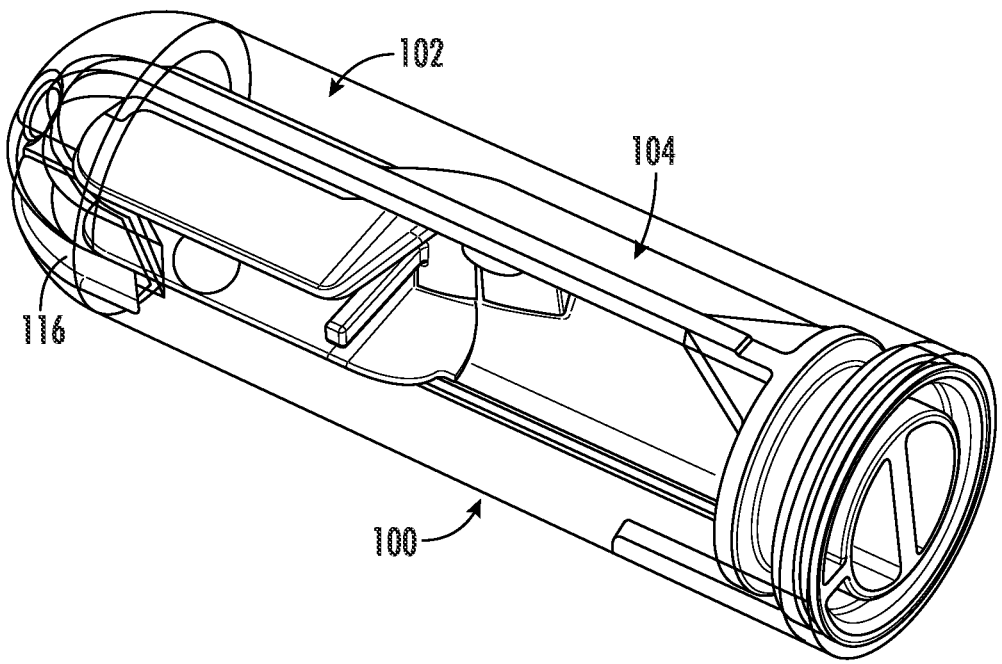
FIG. 2 is a bottom perspective thereof.
Figure 3:
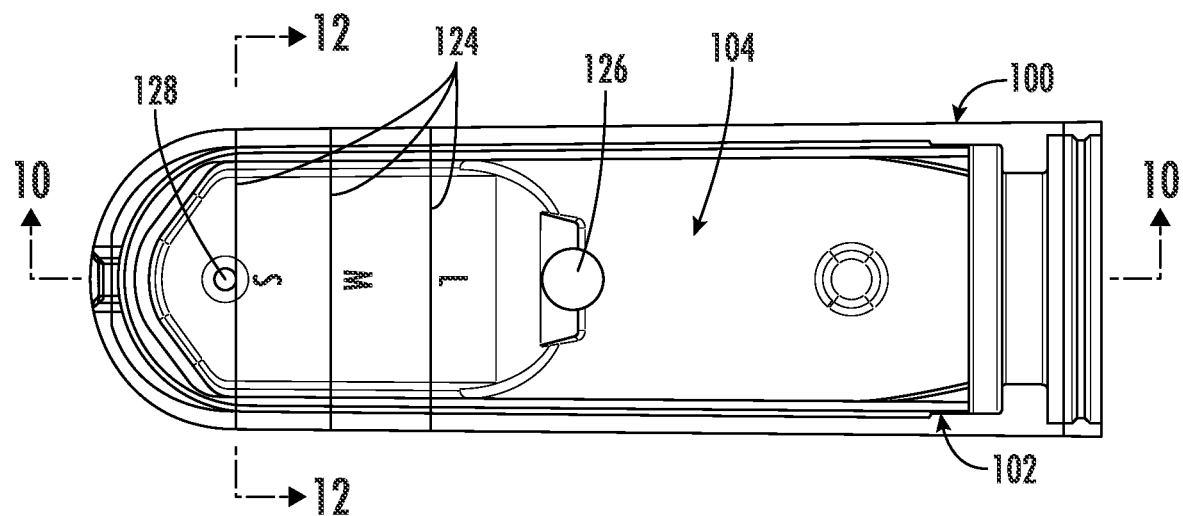
FIG. 3 is a top view thereof.
Figure 4:
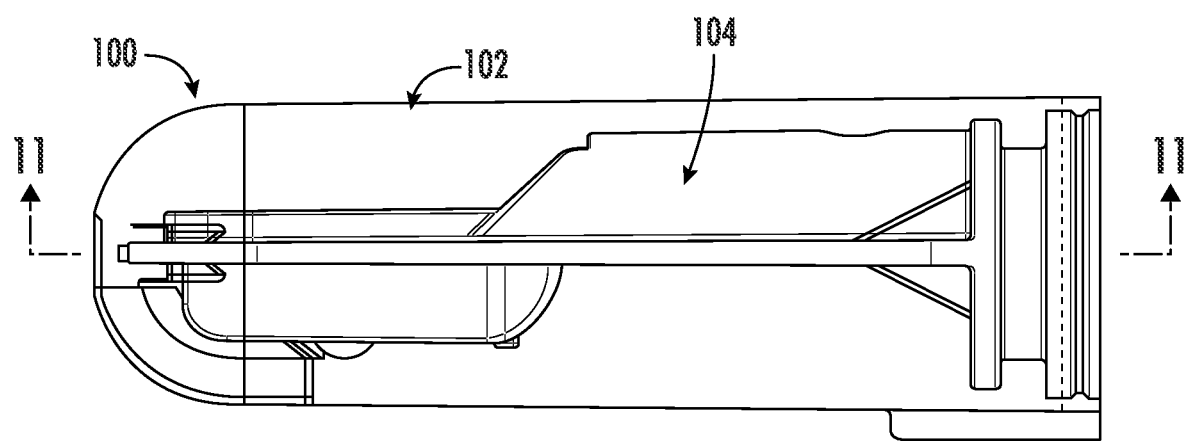
FIG. 4 is a side view thereof.
Figure 6:
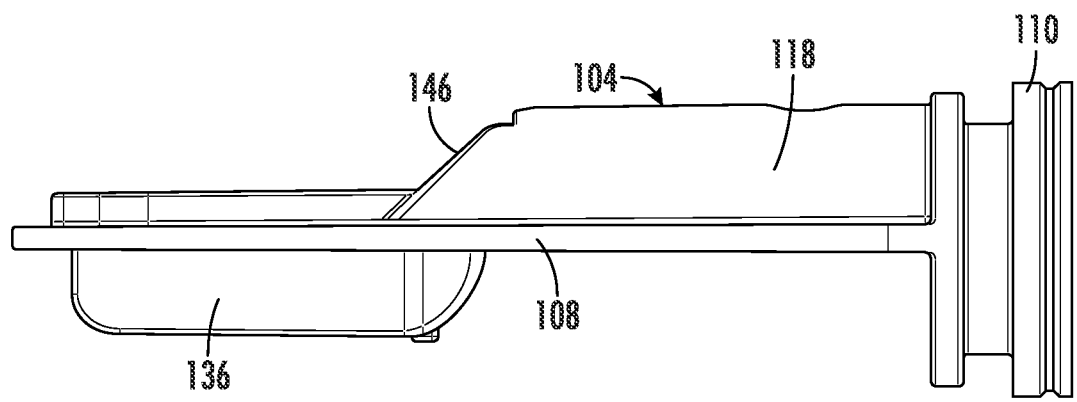
FIG. 6 is a side view of an exemplary flow regulator according to various embodiments of the invention.
Figure 7:
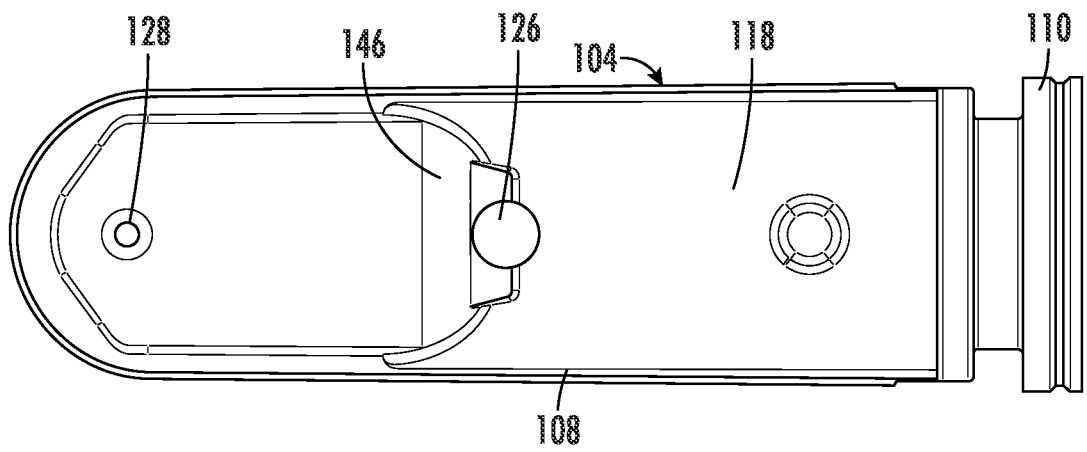
FIG. 7 is a top view thereof.
Figure 8:
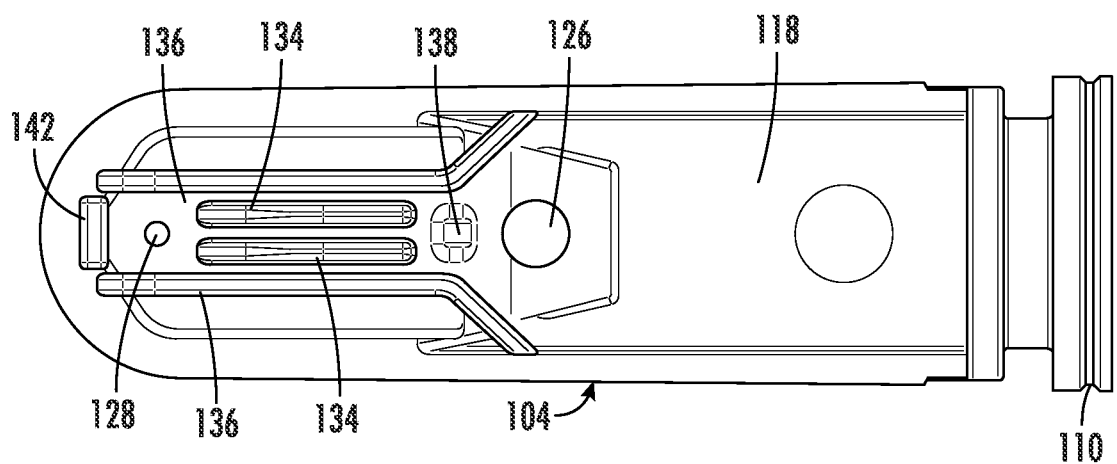
FIG. 8 is a bottom view thereof.
Figure 9:
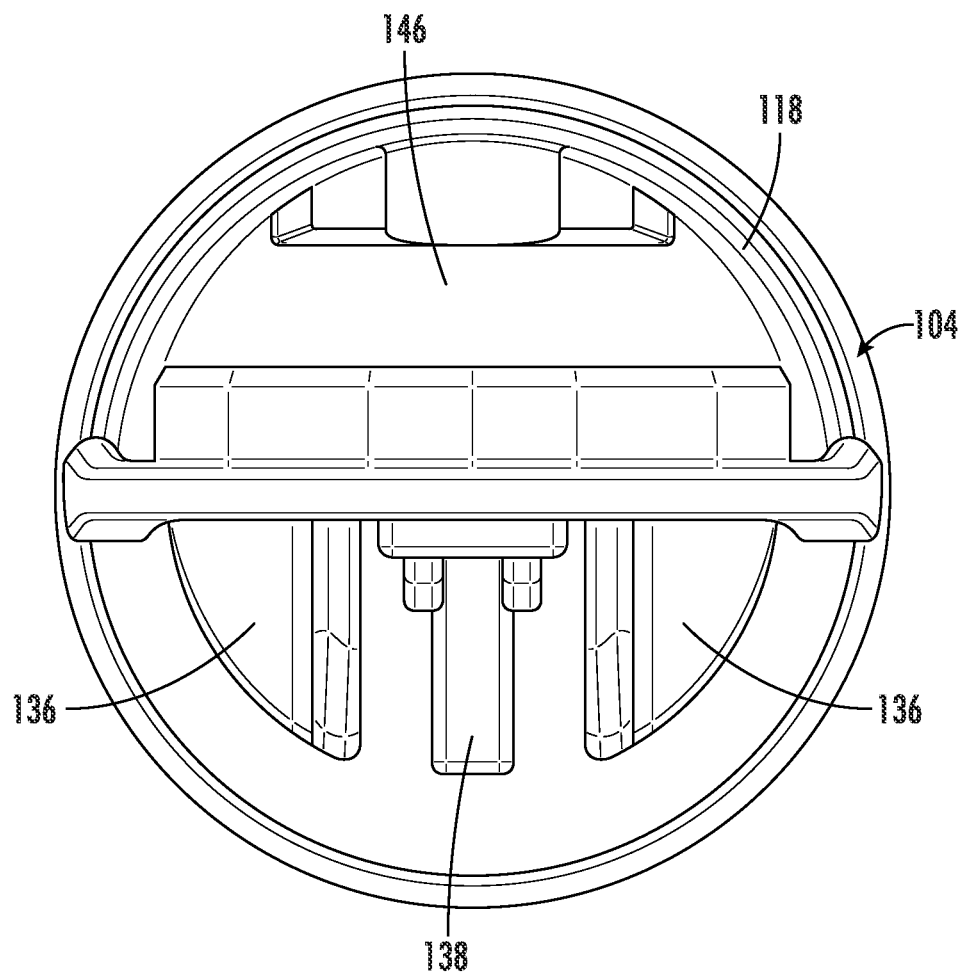
FIG. 9 is a front view thereof.
Figure 10:
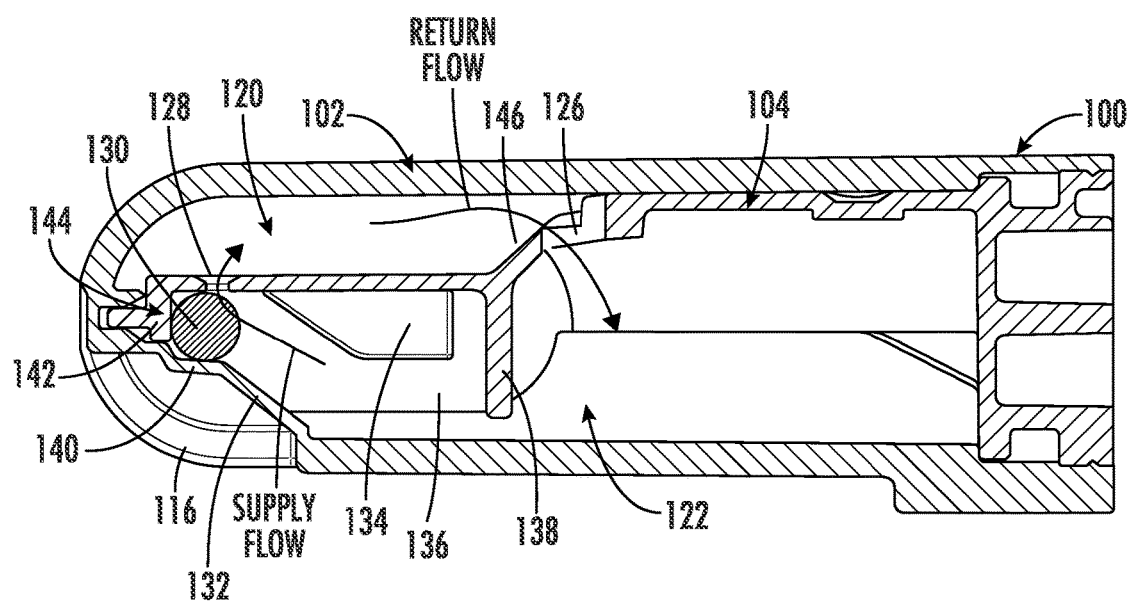
FIG. 10 is a cross-sectional view of the exemplary timing device as taken along line 10-10 of FIG. 3.
Figure 11:
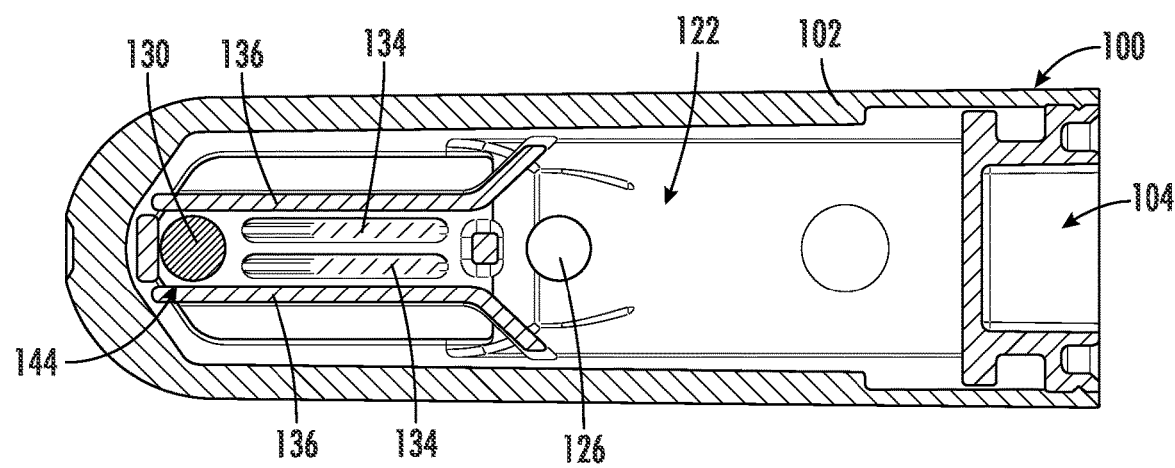
FIG. 11 is a cross-section view of the exemplary timing device as taken along line 11-11 of FIG. 4.
Figure 12:
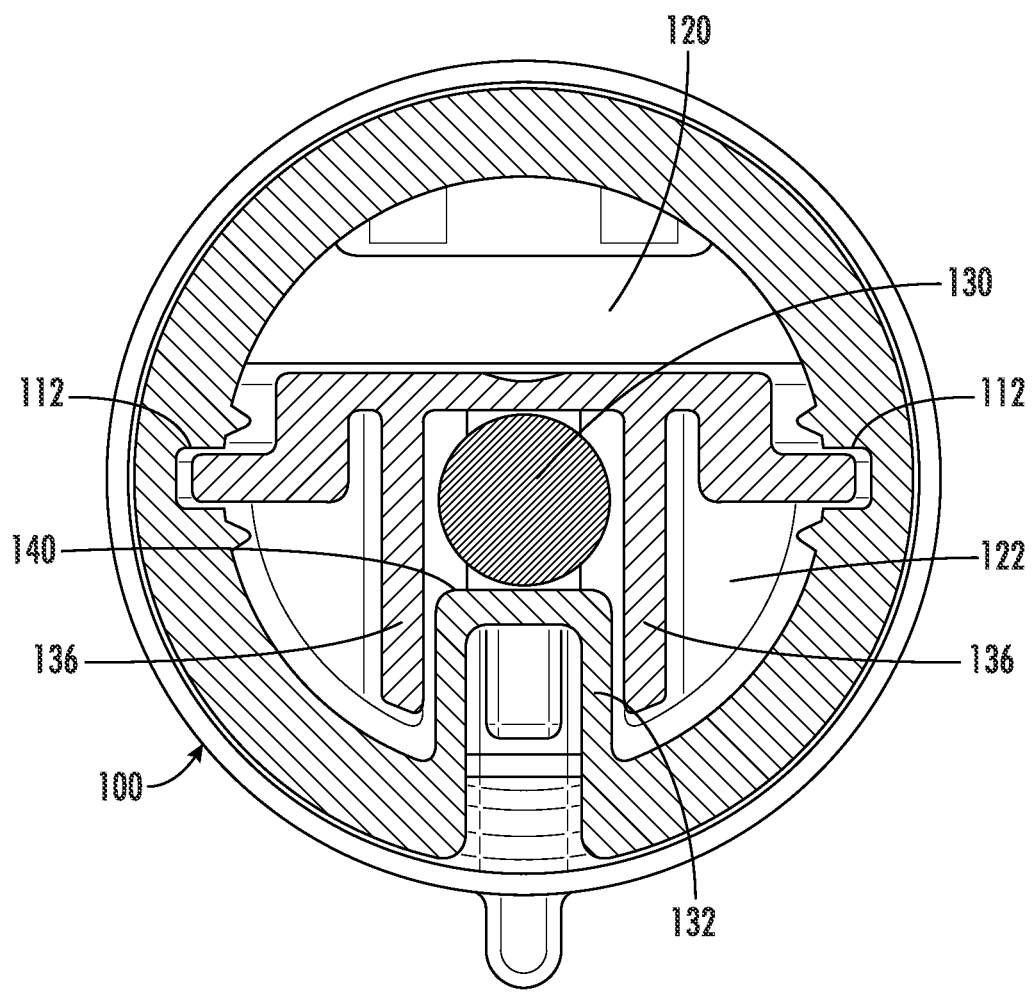
FIG. 12 is a cross-sectional view of the exemplary timing device as taken along line 12-12 of FIG. 3.
Figure 13:
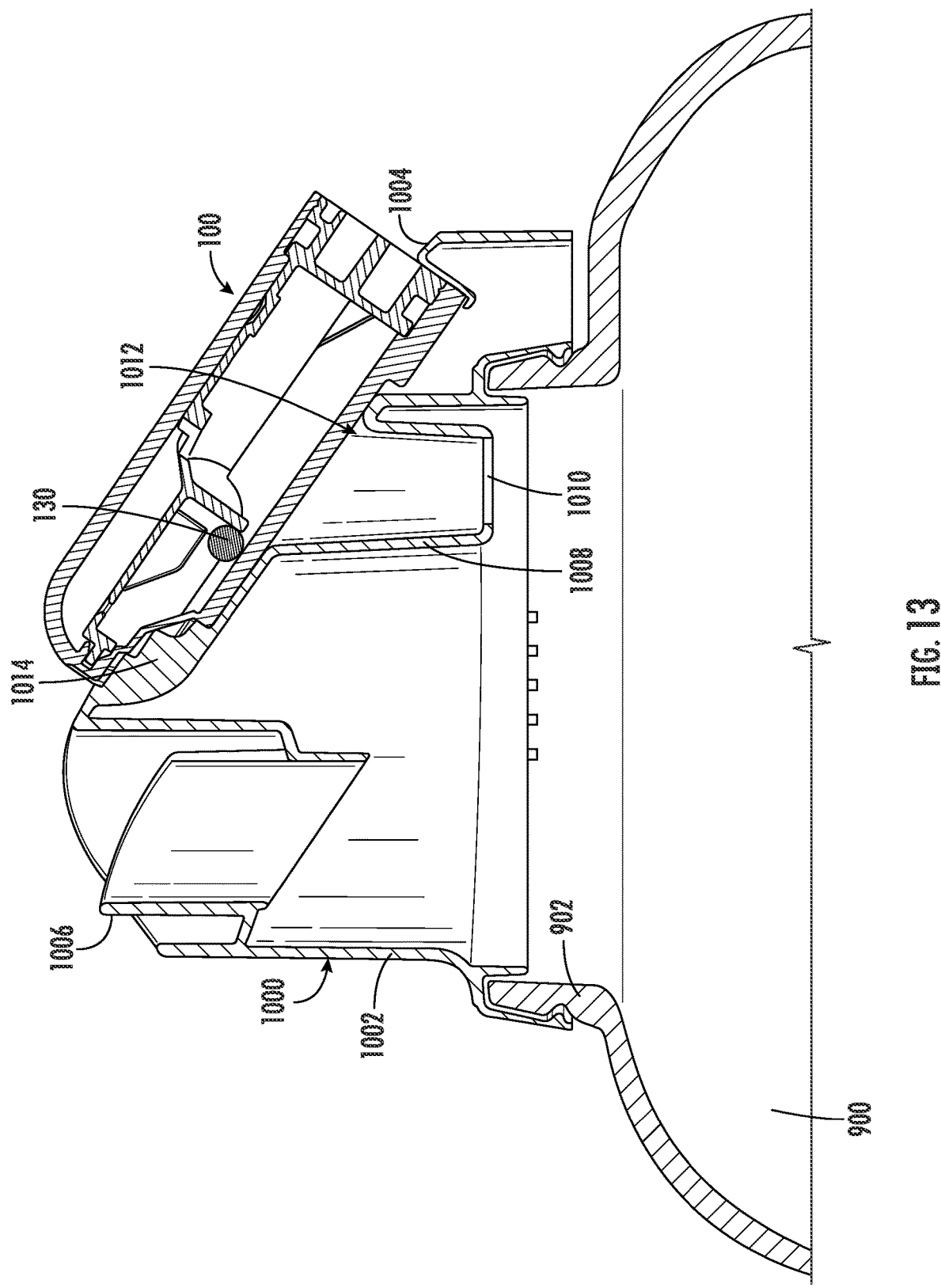
FIG. 13 illustrates an arrangement of the exemplary timing mounted with an exemplary pour cap and container.

As best illustrated in FIG. 13, the timing device 100 may be seated externally at a rear portion of the cape base. In some exemplary embodiments, the cap base 1000 may include a recess 1012 into which a timing device 100 may be removably seated, and may include mounting structures or a mounting tab 1014 onto which the timing device 100 is secured or held in place. The timing device 100 may be advantageously located on the pour cap 1000, directly adjacent to the rear of the dispensing spout 1006 and supported at an angle so that the timing device 100 is easily visible to a user during operation or use of the dispensing system. In an exemplary embodiment, the timing device 100 is mounted at a 55° angle behind the dispensing spout 1006 (see FIG. 13). In other embodiments, the timing device 100 may be mounted at an angle ranging from 40° to 70°.

Turning back to FIGS. 1-12, an exemplary timing device 100 according to various embodiments is illustrated in detail. Timing device 100 may include a transparent or translucent outer cylinder 102 having an open end and a hollow interior space defined by the inner walls of the outer cylinder 102. The timing device 100 may further include a flow regulator 104 received within the outer cylinder 102 and a flowable material 106, such as a colored fluid received within the interior space of the outer cylinder 102. In some embodiments, the flowable material 106 may comprise a flowable liquid silicone material. Flow regulator 104 includes a generally planar, elongate main body portion 108 and an end cap portion 110. Flow regulator 104 may be inserted in the open end of the outer cylinder 102 where the end cap portion 110 may seal, or close, the end of the outer cylinder 102 into which it is placed. The inner surface of the outer cylinder 102 may include guide rails 112 which receive and orient the flow regulator 104 within the interior of the outer cylinder 102. The outer surface of the end cap portion 110 and the inner surface of the outer cylinder 102 may include complementary sealing ribs to prevent leakage and maintain the end cap 110 assembled with the outer cylinder 102. The outer surface of the open end of the outer cylinder 102 may include an orientation fin 114 extending radially outward which is perpendicular to the inner guide rails 112 and thus oriented perpendicular to the plane of the main body portion 108 of the flow regulator 104, the purpose of which will become more apparent hereinbelow. Additionally, the terminal end of the outer cylinder 102 includes an inward longitudinally extended recess 116 which receives the corresponding mount tab 1014 within the mounting recess 1012 on the cape base 1002. When the timing device 100 is assembled with the cap base 1002, the mating structures interfit to maintain a proper rotational alignment of the timing device 100 relative to the pour cap 1000.

Referring to FIGS. 5-9, the upper portion of the main body 108 of flow regulator 104 may include an upwardly extending curved wall 118 forming a cavity therebeneath. Positioning of flow regulator 104 within the outer cylinder 102 may define a timing reservoir 120 and a storage reservoir 122 separated by the main body portion 108 of the flow regulator 104 and defined by the resting angle of the timing device 100. The timing reservoir 120 is defined in the smaller area above the main body 108 while the storage reservoir 122 is below the main body 108. In the exemplary embodiment, the timing device 100 is configured and oriented so that the timing fluid 106 normally resides in the storage reservoir 122 in a resting condition and fills the timing reservoir 120 during a dispensing cycle. Marking or indicator lines 124 (See FIG. 3) may be provided in association with the timing reservoir 120. In this regard, some embodiments may include one or more indicator markings 124 on the outer cylinder 102 while other embodiments may provide the markings on the upper surface of the flow regulator. When the consumer tilts the bottle 900 and the attached timing device 100, the fluid 106 in the timer transfers by gravity from the storage reservoir 122 to the timing reservoir 120 passing the indicator lines 124, which may, for example, be labeled as S, M and L designating "small", "medium" and "large" doses. As the timing fluid meniscus passes the marking lines 124, this indicates to the consumer that they have dosed a small medium or large amount of product from the pour spout 1006.

Figure 14:
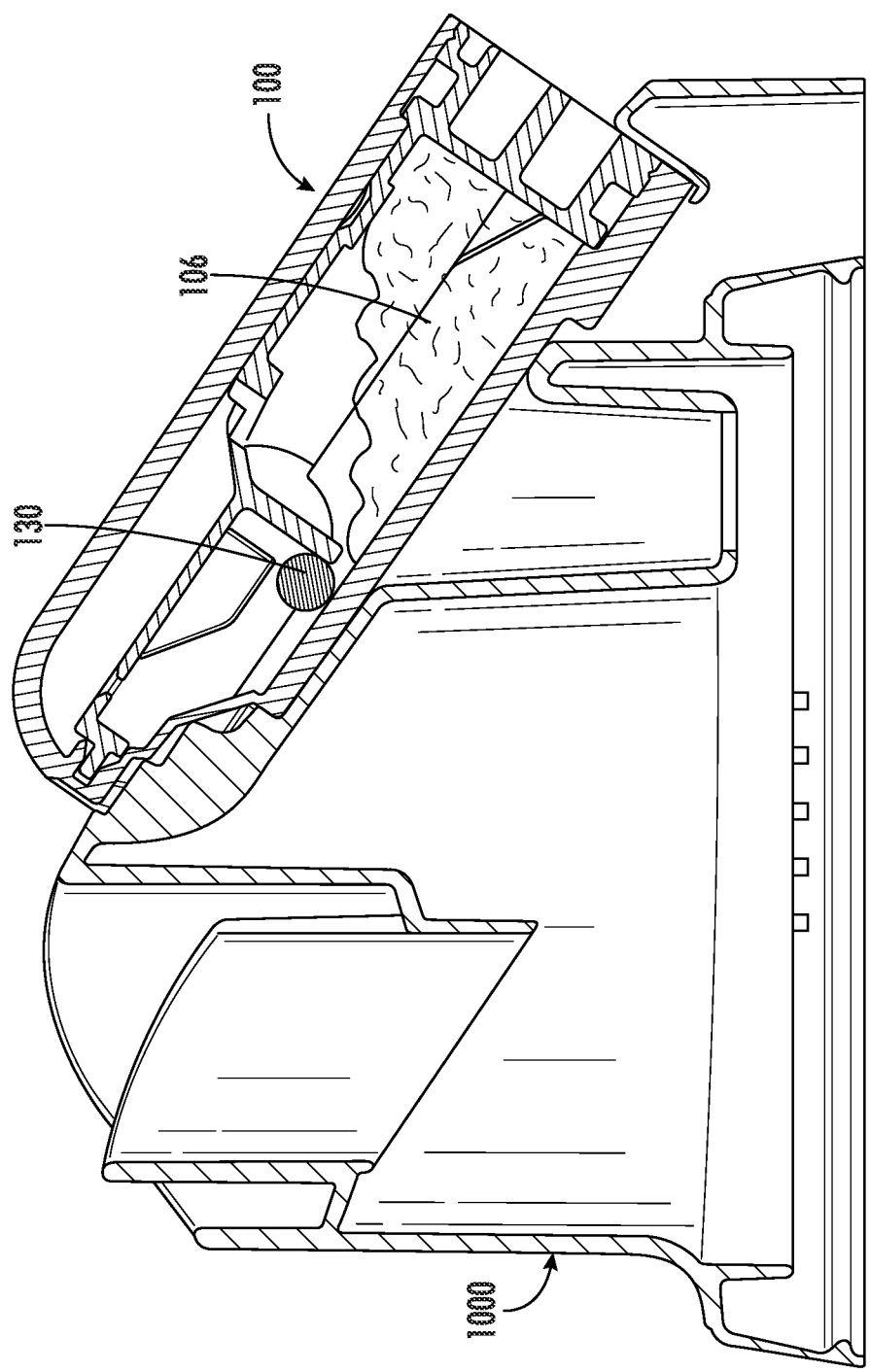
FIGS. 14-16 illustrate exemplary pouring and timing scenarios showing movement of the check ball and flow of the timing fluid within the timing device.

Flow regulator 100 may include a return flow opening 126 extending from the timing reservoir 120 into the storage reservoir 122. The return flow opening 126 may preferably located on the curved wall 118. As can be seen in FIGS. 13-14, the mounting angle and orientation of the timing device 100 allows the timing fluid 106 at a resting position to collect in the storage reservoir 122 below the main body portion 108. In this static resting position, the timing fluid 106 is not visible to the user. As noted above, the timing device 100 is received into a recess 1012 in the pour cap 1000, thus partially shrouding the lower portion of the timing device 100 and hiding the stored timing fluid 106 from the user's view. In some embodiments, the timing device 100 may further comprise an opaque sleeve (not shown) or other covering or shroud surrounding the area of the storage reservoir 122. Shrouding of the storage reservoir 122 provides a more aesthetically pleasing presentation of the timing sequence where the user will only see the timing fluid 106 filling the timing reservoir 120 during a dispensing cycle.

A fluid supply opening 128 is defined in the flow regulator 104 adjacent the terminal end of the main body 108. The supply opening 128 has a fluid entrance on the lower surface of the main body 108 and an exit on the upper surface leading into the timing reservoir 120. One can appreciate that as the container 900 is tipped toward horizontal and beyond (see FIGS. 14-16), fluid 106 in the storage reservoir 122 will flow towards the terminal end of the main body portion 108 and may flow through the supply opening 128 into the timing reservoir 120. Based on the viscosity of the timing fluid 106, the size of the opening 128, and the actual pouring angle, the timing fluid 106 will flow through the opening 128 and gradually fill the timing reservoir 120.

In this regard, the pouring angle of the container 900, the amount of product currently in the container 900, the angle of timing device 100, and the size of the opening 128 all cooperate to coordinate simultaneous flow of the product from the spout 1006 with flow of the fluid 106 in the timing device 100 and to thereby to create a defined measurement of product flow from the container 900 correlated with filing of the timing reservoir 120, or partial filling of the timing reservoir 120, at the marked indications 124 on the outer cylinder 102.

One issue that the exemplary embodiments address is a difference in the amount of dispensed product based on the amount of product left in the container 900. When the container 900 is full and tipped for dispensing, the product has a higher head pressure and thus flow faster. As product is dispensed, the head pressure with each further dispensing cycle lessens and the product flows more slowly. Since the timing device 100 has a fixed amount of timing fluid, the timing cycle is fairly consistent in the amount of time it takes to fill the timing reservoir 120 during a dispensing cycle. The noted difference in product head pressure thus reduces the amount of product dispensed with each cycle, i.e. same timing but less product dispensed because of less head pressure.

In order to provide a more consistent product dispensing volume regardless of container volume, the timing device 100 may further include a variable flow restrictor, which in the exemplary embodiment comprises a check ball 130 that rolls within the storage reservoir 122 to variably change the flow through the supply opening 128. Movement of the check ball 130 is guided by an angled ramp 132 within the storage reservoir 230 adjacent the fluid supply hole 128. The ramp 132 may be formed as part of the internal wall of the outer cylinder 102. Additionally, longitudinally extending shoulder walls 134 project downwardly from the bottom surface of the main body portion 108. A rearward portion of the shoulder walls 134 run parallel to the inner surface of the outer cylinder 102 and then taper upwardly toward the supply opening 128 paralleling the angled ramp 132. The ramp 132 and shoulder walls 134 thus form lower and upper guide boundaries for the check ball 130. The check ball 130 is further guided on its sides by symmetrical spaced guide walls 136 extending downwardly from the bottom surface of the main body portion 108 beneath the timing reservoir 120 at least partially towards the inner surface of the outer cylinder but leaving a space therebetween for movement of the timing fluid 106. The check ball 130 is retained at the rearward end of the guide structures by a separate retention post 138 extending downward from the main body portion between the spaced guide walls 136.

The check ball 130 is sized proportionally to the fluid supply hole 128, i.e. slightly larger so that the ball 130 may seat itself adjacent the supply hole 128 when the timing device 100 is fully tipped and create a flow restriction without fully blocking the supply hole 128. At the terminal end of the timing device, there is a plateau shelf 140 which runs parallel to the bottom surface of the main body portion 108 immediately adjacent to the supply hole 128. A downwardly turned lip 142 at the terminal end of the main body portion cooperates with the shelf 140, and side walls 136 and forms a seat 144 which, as noted above, allows the check ball 130 to rest slightly off center below the supply hole 128 and create a flow restriction without fully blocking the supply hole 128. The ball 130 and guide structures (ramp 132, shoulder walls 134, side walls 136) generally create flow restrictions within the storage reservoir 122 and slow the flow of timing fluid 106 into the timing reservoir 120 when only partially tipped past horizontal. When fully tipped, the check ball 130 rides up the ramp 132 to seat itself adjacent to the opening 128, partially blocking fluid flow into the timing reservoir 120 and further extending to pouring cycle.

Figure 16:
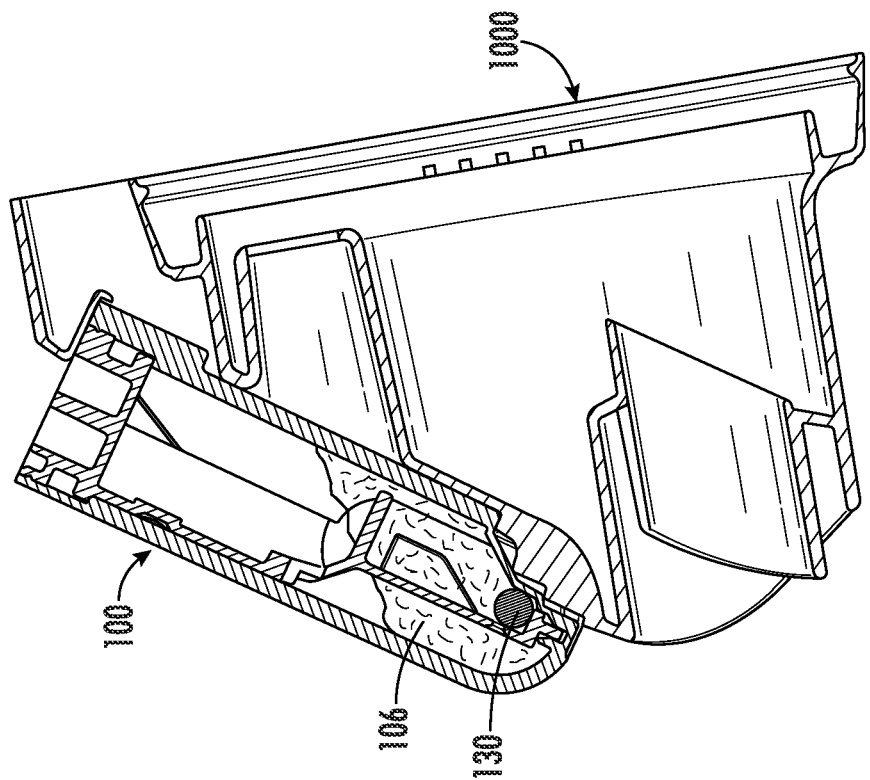
Figure 15:
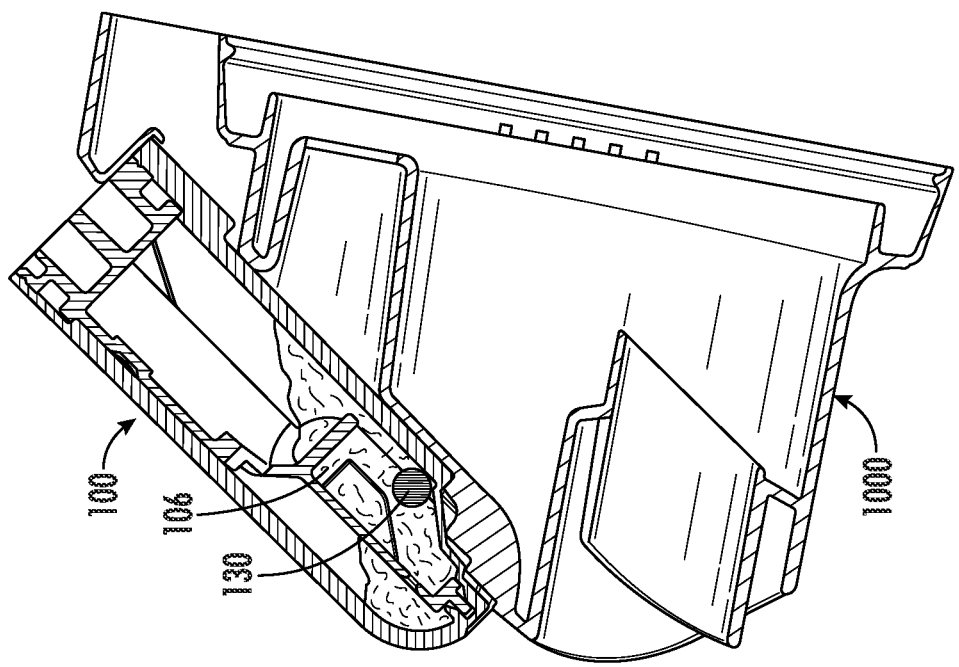

Several dispensing/timing cycle scenarios are illustrated in FIGS. 14-16. FIG. 14 illustrates the normal resting position of the timing device 100. The timing fluid 106 resides within the storage reservoir 122 beneath the main body 108 and the check ball 130 sits in the lower portion thereof due to gravity. FIG. 15 illustrates an interim dispensing angle where product is flowing but the check ball 130 has not yet had time to reach the terminal end seat 144 of the timing device 100. The rearward end of the ramp 132 may "catch" the check ball 130 before it begins to ascend the ramp. In this position, the check ball 130 does not yet interfere with flow of the timing fluid 106. FIG. 16 illustrates a steeper dispensing angle just past horizontal where the check ball 130 is fully seated in the plateau shelf 140 at the top of the ramp 132 adjacent to the supply opening 128. In this position, the check ball 130 will significantly slow the flow of timing fluid 106 through the opening 128 extending the filling time of the timing reservoir 120. As can now be appreciated, as the volume of product in the container 900 decreases, the time to fill the timing reservoir 120 will gradually lengthen and allow more product to be dispensed.

Turing back to FIGS. 13 and 14, when the container 900 is returned to the resting position, the timing fluid 106 flows up and over an angled wall portion 146 and enters into the return flow opening 126 disappearing back into the storage reservoir 122.

Another exemplary timing device 200 is illustrated in FIGS. 17-20. The timing device 200 may similarly include a similar transparent or translucent outer cylinder 202 as previously described hereinabove with a flow regulator 204 received within the outer cylinder 202 and a flowable material 206, such as a colored fluid received within the outer cylinder 202. In some embodiments, the flowable material 206 may comprise a flowable liquid silicone material.

Flow regulator 204 is similar to the embodiment 104 described hereinabove with the exception of the guide structures for the check ball 230. The flow regulator 204 includes a generally planar, elongate main body portion 208 and an end cap portion (not shown). Flow regulator 204 may be inserted into the outer cylinder 202 as noted above where the end cap portion may seal, or close, the end of the outer cylinder into which it is placed. The outer surface of the end cap portion and the inner surface of the outer cylinder 202 may include complementary sealing ribs to prevent leakage and maintain the end cap assembled with the outer cylinder 202.

The upper portion of the main body 208 of flow regulator may include an upwardly extending curved wall 218 forming a cavity therebeneath. The inner surface of the outer cylinder 202 may include guide rails (not shown) which receive the main body as described above and orient the flow regulator 204 within the interior of the outer cylinder 202.

Positioning of flow regulator 204 within the outer cylinder 202 may define a timing reservoir 220 and a storage reservoir 222 separated by the main body portion 208 of the flow regulator 204 and defined by the resting angle of the timing device 200. The timing reservoir 220 is defined in the smaller area above the main body 208 while the storage reservoir 222 defined is below the main body 208.

Flow regulator 204 may include a return flow opening 226 extending from the timing reservoir 220 into the storage reservoir 222.

A fluid supply opening 228 is defined in the flow regulator 204 adjacent the terminal end of the main body 208. The supply opening 228 has a fluid entrance on the lower surface of the main body 208 and an exit on the upper surface leading into the timing reservoir 220.

Like the above embodiment 100, the present exemplary embodiment comprises a check ball 230 captured in storage reservoir 222 in the space beneath the timing reservoir 220.

Movement of the check ball 230 is guided by a stepped ramp 232 within the storage reservoir 222 adjacent the fluid supply hole 228. The stepped ramp 232 in this exemplary embodiment may be formed as part of the flow regulator structure 204 and includes an initial step shoulder 250 at the lower end of the ramp 232 forming an initial catch point. The ramp 232 has a lower plateau area 252 and an intermediate steeper inclined area 254 which effectively forms a second catch point closer to the supply opening 228. The flow regulator 204 notably lacks the earlier described upper guide shoulders. The check ball 230 is guided on its sides by symmetrical spaced guide walls 236 extending downwardly from the bottom surface of the main body portion 208.

At the terminal end of the ramp 232, there is an upper plateau shelf 256 which runs parallel to the bottom surface of the main body portion 208 immediately adjacent to the supply hole 228. A downwardly turned end of the main body portion 208 cooperates with the upper shelf 256, and side walls 236 and forms a seat 258 which, as noted above, allows the check ball 230 to rest slightly off center below the supply hole 228 and create a flow restriction without fully blocking the supply hole 228. The check ball 230 and guide structures (ramp 232, walls 236) generally create flow restrictions within the storage reservoir 222 and slow the flow of timing fluid 206 into the timing reservoir 220 when only partially tipped past horizontal. When fully tipped, the check ball 230 rides up the ramp 232 to seat itself adjacent to the opening 228, partially blocking fluid flow into the timing reservoir 220 and further extending to pouring cycle.

The ball 230 is retained at the rearward end of the guide structures by a retention post 238 extending downward from the main body portion 208 between the spaced guide walls 236.

Figure 18:
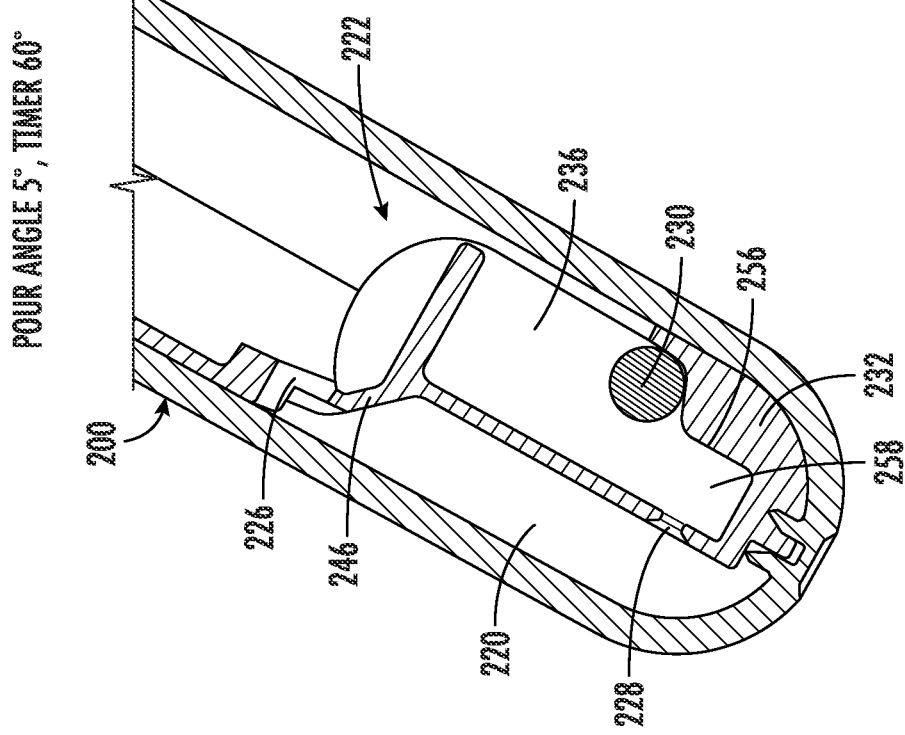
FIGS. 17-20 illustrate the arrangement of another exemplary timing device according to various embodiments of the invention and movement of the check ball within the timing device at various pouring angles.
Figure 17:
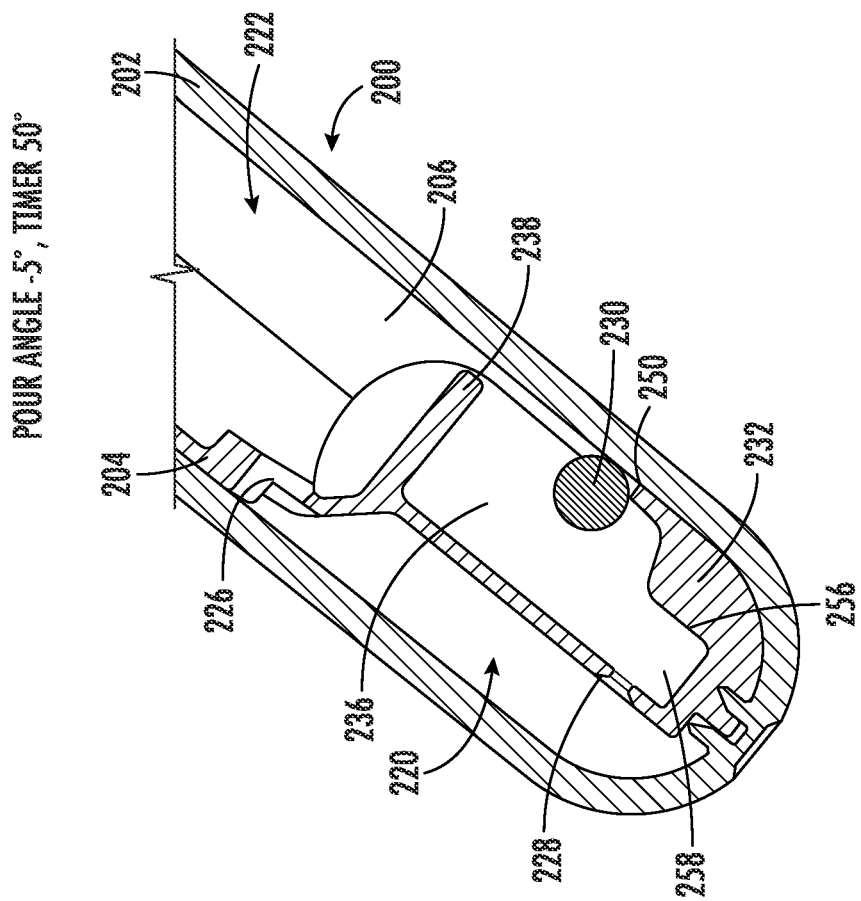
Figure 20:
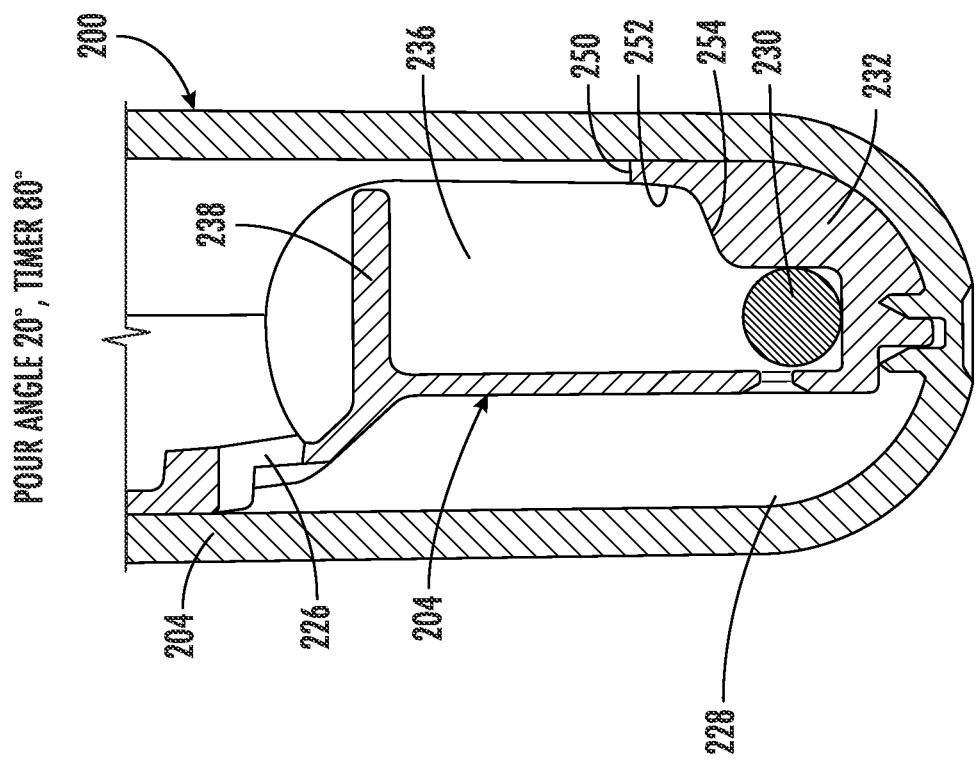
Figure 19:
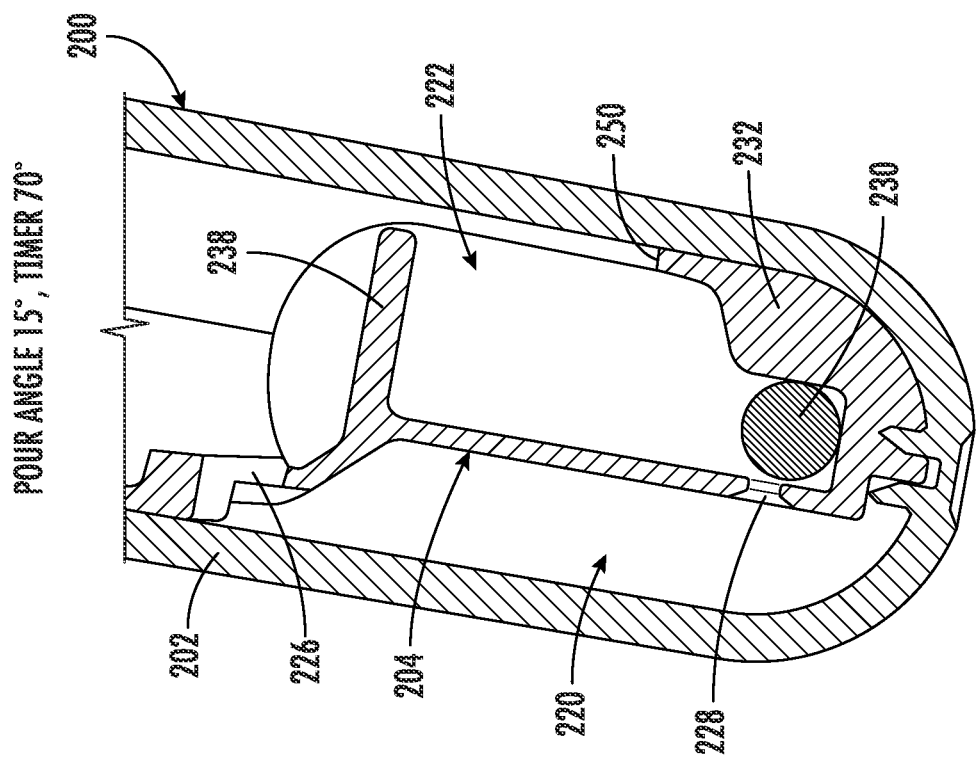

Several dispensing/timing cycle scenarios are illustrated in FIGS. 17-20. FIG. 17 illustrates a first interim dispensing angle where product is flowing but the check ball 230 is initially caught at the first step shoulder 250 of the ramp 232. In this position, the check ball 230 only begins to partially interfere with flow of the timing fluid 206. FIG. 18 illustrates a second interim dispensing position where product is flowing but the check ball 230 is caught at the intermediate lower plateau 252 and incline 254 of the ramp 232. In this position, the check ball 230 narrows the flow area and further interferes with flow of the timing fluid 206. FIGS. 19 and 20 illustrate steeper dispensing angles where the check ball 230 is fully seated in the plateau shelf 256 at the top of the ramp 252 adjacent to the supply opening 228. In this position, the check ball 230 will significantly slow the flow of timing fluid 206 through the opening 228 extending the filling time of the timing reservoir 220. As can now be appreciated, as the volume of product in the container 900 decreases, the time to fill the timing reservoir 220 will gradually lengthen and allow more product to be dispensed.

While various embodiments of the invention have been described with respect to a fluid contained in the timing device, it is understood that other embodiments may utilize other flowable fluids or dry flowable materials, such as powder or granules. In various embodiments, a fluid or flowable material may be colored to offer a contrast to make it easier for a user to visualize the flow in the timing device.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A timing device for metering a flowable product dispensed from a dispensing system including a pour cap with a spout, the timing device comprising:
   a transparent or translucent outer cylinder;
   a flow regulator within the outer cylinder;
   a timing fluid contained within the timing device,
   said flow regulator and said outer cylinder defining a storage reservoir and a timing reservoir, said flow regulator including a supply opening between the storage reservoir and the timing reservoir and a return opening between the timing reservoir and the storage reservoir;
   a check element movable within the storage reservoir;
   parallel spaced guide walls extending downwardly from the flow regulator; and
   a retention post extending downward from the flow regulator portion between the spaced guide walls,
   said guide walls and said retention post forming a guideway for movement of the check element within the storage reservoir to at least partially restrict flow from the storage reservoir into the timing reservoir when the timing device is tilted to a dispensing angle.

2. The timing device of claim 1 wherein the timing fluid comprises a colored fluid.

3. The timing device of claim 1 wherein the storage reservoir is defined beneath the flow regulator and the timing reservoir is defined above the flow regulator.

4. The timing device of claim 1 wherein the storage reservoir is filled with said timing fluid and said timing reservoir is void of said timing fluid when said timing device is at a resting position.

5. The timing device of claim 4 wherein said timing fluid flows from said storage reservoir into said timing reservoir when said timing device is tilted to a pouring angle.

6. The timing device of claim 1 further comprising marking indicators visible relative to said timing reservoir.

7. The timing device of claim 2 further comprising marking indicators visible relative to said timing reservoir.

8. The timing device of claim 6 wherein said marking indicators are on said outer cylinder.

9. The timing device of claim 2 wherein said marking indicators are on said outer cylinder.

* * * * *